United States Patent Office 2,897,118
Patented July 28, 1959

2,897,118

STABLE VITAMIN A COMPOSITIONS

John E. Allegretti, North Bergen, N.J., assignor to Merck & Co., Inc., Rahway, N.J., a corporation of New Jersey No Drawing. Application May 24, 1957
Serial No. 661,299

13 Claims. (Cl. 167—81)

This invention is concerned with stable vitamin compositions. More particularly, it relates to compositions of oil-soluble vitamins which compositions are highly stable and suitable for use in animal feeds or in pharmaceutical preparations. Still more particularly, it is concerned with vitamin A preparations which can be incorporated in animal feeds or feed supplements and in pharmaceutical products with no marked resulting loss of vitamin A activity. It is concerned also with methods of making such preparations.

Vitamin A, usually in the form of one of its esters, is widely used in animal feedstuffs and in certain pharmaceutical preparations. Because of their chemical and physical properties, however, vitamin A esters as such are not stable under use conditions and it is the universal practice to formulate or compound them in some fashion to reduce the degree and rapidity of decomposition. Heretofore, most methods of attempted stabilization have entailed coating the vitamin particles so as to reduce loss by protecting the vitamin from contact with oxygen or with other components of the feed mixture. It has been suggested to stabilize vitamin A esters by coating with plastic compounds or with the so-called "enteric coatings." It has also been suggested to encase the vitamin in materials such as gelatin or colloidal substances. Many techniques of making oxygen-impervious gelatin coatings have been studied and described. Gelatin alone has been employed as a coating agent, and attempts to increase stability by utilization of certain synthetic resinous materials along with gelatin are known. Most of these approaches have led to products or compositions which are more stable than the vitamin A esters themselves, but there is still difficulty in obtaining a completely satisfactory material.

It is an object of the present invention to provide a highly stable form of vitamin A suitable for addition directly to animal feed supplements or to pharmaceutical products. It is a further object to provide a dry free-flowing powder containing vitamin A activity in which the vitamin activity is highly stable. An additional object is provision of stable vitamin A compositions in which a vitamin A ester is the source of vitamin activity. Another object is a process for making such compositions. Further objects will be apparent from the detailed description of the invention hereinbelow.

According to my invention highly stable vitamin A-active compositions are prepared by reacting together formaldehyde and partially hydrolyzed casein in the presence of a vitamin A ester. The partially hydrolyzed casein and formaldehyde react to form a solid to semi-solid putty-like mass with the vitamin occluded or bound within this mass of resinous material. The product may then be granulated to give a yellowish dry free-flowing powder. The vitamin A ester as present in this composition is very stable, and may be added as such to animal feed supplements or incorporated in tablets or capsules for pharmaceutical use. For optimum stability, it is usual to incorporate one or more antioxidants or stabilizers in the compositions by adding them to the partial hydrolysate of casein or to the vitamin A ester prior to reaction with the formaldehyde.

The choice of particular ester to be used as the source of vitamin A activity in my new compositions is not critical. Typical esters that may be mentioned as representative are the acetate, palmitate, tertiary butyl acetate, pivalate, anthraquinone β-carboxylate and hemi-succinate. Optimum stability of vitamin A activity appears to be obtained with the palmitate and this ester is thus a part of the preferred embodiment of the invention.

In making the compositions described herein, the vitamin A ester is added to an aqueous dispersion of a partial hydrolysate of casein and the resulting mixture stirred or homogenized until the vitamin is uniformly dispersed therein. The amount of ester to be employed will depend upon the desired vitamin A potency of the final product. The final level of vitamin A activity may be varied from as low as about 10,000 units per gram of end product up to about 500,000 units per gram. The higher concentrations are desirable when the material is intended for pharmaceutical use, whereas levels of 200,000–300,000, and particularly about 250,000, vitamin A units per gram are advantageous when the final product is to be incorporated in animal feed supplements. Since the physical weight of vitamin A-active composition obtained by the method of this invention corresponds closely to the weight of solids charged to the reaction, the quantity of vitamin A ester necessary to obtain the desired potency in the end product is readily determinable. In referring to units of vitamin A activity the international unit is meant.

It is advantageous to incorporate an antioxidant or mixture of antioxidants in the vitamin A compositions. This is conveniently accomplished by adding the antioxidants to the vitamin A ester before mixing it with the partial hydrolysate of casein. Depending upon the amount of antioxidant and the particular vitamin A ester employed, slight warming of the vitamin may be necessary to effect complete solution of the antioxidant. Where such is necessary, it is well to carry out this operation in an inert atmosphere in order to minimize decomposition of the vitamin A.

As the preferred antioxidant, I employ a mixture of butylated hydroxy toluene and butylated hydroxy anisole. The total amount of antioxidant may be varied from about 5 to about 25% by weight of the vitamin A ester and preferably is about 20% by weight of the vitamin A. In using the butylated hydroxy anisole-butylated hydroxy toluene antioxidant system in the preferred embodiment of the invention, about 10% of each antioxidant is employed. Other antioxidants such as ascorbyl palmitate or α-tocopherol are also suitable. In some instances, it is desirable to add a small amount of an amine to the vitamin A-antioxidant-partial hydrolysate mixture before reacting with the formaldehyde. Thus, about 5–15% (based on the weight of vitamin A ester) of amines such as cyclohexylamine, N-ethylpiperidine or dibutylamine may be employed to improve the effectiveness of the antioxidant system.

The partially hydrolyzed casein which is one of the reactants in my process may be prepared by enzymatic or acid hydrolysis of casein. Such "partial hydrolysates" or "products of mild hydrolysis" are known in the art.

Degradation or hydrolysis of casein is known to proceed according to the route:

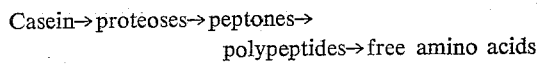

Casein→proteoses→peptones→
        polypeptides→free amino acids

By a "partial hydrolysate" or a "product of mild hydrolysis" is meant one in which the hydrolysis has been stopped at an intermediate stage of this degradative scheme. As will be realized by those skilled in protein chemistry, a partial hydrolysate will not as a rule contain, for instance, entirely proteoses or entirely peptones, but rather will be a mixture of the various intermediate degradative products. It will, however, contain only relatively small amounts of casein itself or of the free amino acids.

The partial or mild hydrolysis of casein may be carried out either enzymatically or with dilute mineral acids. Enzymes known to be suitable for this purpose are proteolytic enzymes such as pepsin and trypsin. For the purpose of this invention, it is not necessary that the partial hydrolysate of casein have any exact proportion or ratio of proteoses, peptones or polypeptides, and it is realized that the composition of any given hydrolysate will vary within limits depending upon the conditions of hydrolysis. It is desirable, however, that the partial hydrolysate have an alpha-amino nitrogen content of from less than 1% to about 10%, and preferably from 0.5% to 7.0%. Very stable vitamin A compositions are obtained when the alpha-amino nitrogen content of the partial hydrolysate reactant is about 1%. The alpha-amino nitrogen content is readily determined by the Van Slyke method.

The partial hydrolysates are formed as aqueous dispersions or suspensions and I find it convenient to use such dispersions directly in the process. For reaction with the formaldehyde, it is desirable to use dispersions which are reasonably high in solids content, since excess water must eventually be removed by drying, but which are fluid enough to permit uniform mixing of the vitamin A ester and stirring during the reaction with formaldehyde. A hydrolysate having a solids content of about 25–45%, and preferably of about 30–35% is conveniently utilized.

As described previously, the highly stable compositions of the invention are obtained by reacting this partial hydrolysate of casein with formaldehyde in the presence of a vitamin A ester, i.e. with the ester uniformly dispersed in the aqueous hydrolysate.

Any source of formaldehyde may be employed, one convenient source being an aqueous solution of formaldehyde such as the commercially available 37% solution. On adding such a solution slowly to the casein hydrolysate-vitamin A-antioxidant suspension the reaction mixture changes from a viscous pasty mass to a semi-solid product. The reaction mixture is stirred or mixed during formaldehyde addition. The reaction temperature is not critical, but it is ordinarily preferred to carry out the mixing at or near room temperature. The reaction product of formaldehyde and the partial hydrolysate of casein has initially a semi-solid, putty-like consistency so that during and after formaldehyde addition it may be necessary to scrape the mixer blades and sides of the reaction vessel intermittently in order to remove large masses of product. The mixing is continued for a short period of time, i.e. from about five minutes to one hour, and preferably for about 15 minutes, after formaldehyde addition is complete. During this period some granulation of the resinous product occurs.

In forming the reaction product the ratio of formaldehyde to partial hydrolysate of casein may be varied from about 1:10 parts by weight to about 1:100 parts. For optimum stability and availability of the vitamin A in the compositions, I prefer to react one part of formaldehyde with 10–15 parts of hydrolysate.

The vitamin A ester is uniformly dispersed throughout or intimately admixed with the semi-solid resinous reaction product thus formed. This reaction mass is granulated and dried in order to obtain a dry, uniform, free-flowing powder. The drying operation may be carried out at atmospheric pressure or in a vacuum at temperatures up to about 100° C. However, drying temperatures of about 35–50° C. are normally satisfactory. The resultant material is ready for use in animal feed supplements or in solid pharmaceutical formulations. To achieve uniformity in particle size, the material is usually milled and screened prior to actual use.

Feed supplements containing this highly stable vitamin A composition may be prepared by mixing the composition of the invention with carriers such as distillers' dried grains having also added, if desired, vitamins and growth-promoting agents. The supplement may contain sufficient vitamin A-active composition to give a level of 600,000 international units of vitamin A per pound.

The following examples are given for purposes of illustration and not by way of limitation:

*Example 1*

134 pounds of partially hydrolyzed casein having 30–35% solids and about 1% of α-amino nitrogen was added to a 25 gallon vessel equipped with a double-arm mixer blade. The mixer blade was turned on and a mixture of 10 pounds of vitamin A palmitate, one pound of butylated hydroxy anisole and one pound of butylated hydroxy toluene added to the partially hydrolyzed casein at about 25° C. The 10 pounds of vitamin A palmitate represents about 6.7 billion vitamin A units.

The mixture was stirred until a uniform dispersion was obtained. 12.5 pounds of 37% formaldehyde solution were then added as a spray to the vitamin A-casein solids and mixing continued until the product became granulated. The mass was removed and granulated through a 30 mesh screen, and air-dried at 40° C. for 16 hours. The dry material was milled to a dry, free-flowing product and screened. The material which passed a 30 mesh screen and remained on an 80 mesh screen assayed 250,000 vitamin A units per gram.

*Example 2*

In the series of experiments set forth below the indicated weight of an aqueous dispersion of mildly hydrolyzed casein having about 33% solids and about 1% of α-amino nitrogen was weighed into a tared porcelain mortar. A weighed quantity of vitamin A palmitate oil having the antioxidants dissolved therein was added to the partially hydrolyzed casein, and the oil dispersed throughout the casein with a pestle in order to form a homogeneous paste. Butylated hydroxy anisole (BHA) and butylated hydroxy toluene (BHT) were employed as antioxidants. 37% aqueous formaldehyde solution was added to the dispersion and worked into the paste with a pestle. A semi-solid putty-like mass formed which was granulated by forcing through a 50 mesh screen. The wet granules were dried at 45° C. for about 17 hours. The dry granules were screened and the fraction remaining on a 50 mesh screen and passing a 30 mesh screen washed with petroleum ether and dried.

The vitamin A composition thus obtained was tested for stability by storage at 50° C. for ten days with uncontrolled humidity.

| Wet weight of partially hydrolyzed casein (gms.) | Weight of vitamin A palmitate oil containing 1% BHA and 1% BHT (gms.) | Weight BHA (gms.) | Weight BHT (gms.) | 37% HCHO (mls.) | Drying condition | Vitamin A, u./gm. | | Percent loss vitamin A activity |
|---|---|---|---|---|---|---|---|---|
| | | | | | | Initial assay | Final assay | |
| 72.0 | 1.7 | 0.15 | 0.15 | 3.2 | Vacuum | 103,000 | 94,500 | 8 |
| 19.6 | 1.7 | 0.15 | 0.15 | 0.9 | do | 282,000 | 253,000 | 10 |
| 72.0 | 1.7 | 0.15 | 0.15 | 6.2 | do | 90,000 | 81,000 | 10 |
| 19.8 | 1.7 | 0.15 | 0.15 | 1.7 | do | 315,000 | 304,000 | 3.5 |
| 72.0 | 1.7 | 0.15 | 0.15 | 3.1 | Air | 102,000 | 89,000 | 13 |
| 19.8 | 1.7 | 0.15 | 0.15 | 0.9 | do | 280,000 | 270,000 | 4 |
| 72.0 | 1.7 | 0.15 | 0.15 | 6.2 | do | 91,000 | 84,000 | 8 |
| 19.8 | 1.7 | 0.15 | 0.15 | 1.7 | do | 287,000 | 273,000 | 4.5 |

*Example 3*

In the series of experiments reported below, the indicated amounts of vitamin A acetate, butylated hydroxy anisole (BHA) and butylated hydroxy toluene (BHT) were mixed together and added to 35.0 grams of a partially hydrolyzed casein dispersion having a solids content of 30–35% by weight and an amino nitrogen content of about 1.1%. The mixture was stirred at room temperature in a nitrogen atmosphere until homogeneous.

3.0 mls. of a 37% aqueous formaldehyde solution were added slowly to the above mixture with vigorous stirring. Near the end of the formaldehyde addition the reaction mixture stiffened to a putty-like mass. It was stirred for a few minutes after completion of the aldehyde addition and granulated by passage through a 50 mesh screen. The resulting granules were dried at about 20° C.

| Exp. | Vitamin A acetate ($2.6 \times 10^6$, u./gm.) | BHA, gms. | BHT, gms. | Potency vitamin A, u./gm. |
|---|---|---|---|---|
| (a) | 0.614 | .031 | .031 | 163,000 |
| (b) | 2.06 | .10 | .10 | 344,000 |
| (c) | 0.60 | .06 | .06 | 133,000 |
| (d) | 2.09 | .21 | .21 | 315,000 |

*Example 4*

To a mixture of 0.5 gram of butylated hydroxy anisole and 0.5 gram of butylated hydroxy toluene in 4.6 grams of vitamin A palmitate oil, assaying $1.4 \times 10^6$ units/gram, was added 1800 grams of a partially hydrolyzed casein dispersion. The partial hydrolysate of casein was an aqueous suspension having about 33% solids and about 1% of α-amino nitrogen.

The mixture was stirred until homogeneous and to it was added slowly 156 ml. of 37% formaldehyde. The mixture was stirred during formaldehyde addition and for a short period of time after the addition was completed. The semi-solid material thus obtained was granulated and air-dried. It was a free-flowing powder having 11,500 vitamin A units/gram.

*Example 5*

42.5 grams of butylated hydroxy anisole and 42.5 grams of butylated hydroxy toluene were added to 425 grams of vitamin A palmitate oil having $1.463 \times 10^6$ vitamin A units/gram. The antioxidants were uniformly dispersed throughout the vitamin oil and this mixture then added to 2070 grams of a partial hydrolysate of casein. The dispersion was stirred for a short period of time to insure uniform distribution of vitamin A palmitate throughout the casein hydrolysate.

120 ml. of 37% formaldehyde was added slowly at room temperature and with vigorous agitation to the vitamin A palmitate-casein hydrolysate mixture. During addition of the formaldehyde the reaction mixture thickened in consistency until it became a semi-solid mass. The agitation was continued for a short period after completion of the formaldehyde addition, the product was then granulated and air-dried. The resulting yellowish-powder contained 498,500 vitamin A units/gram.

*Example 6*

To 3.4 grams of vitamin A palmitate oil assaying $1.463 \times 10^6$ units/gram was added 0.34 gram of butylated hydroxy anisole, 0.34 gram of butylated hydroxy toluene and 0.38 gram of cyclohexylamine. The resulting mixture was added to 47 grams of a partial hydrolysate of casein similar to the partial hydrolysate employed in Example 5.

Four ml. of 37% aqueous formaldehyde was added to the above mixture at room temperature and under agitation. The resulting resinous reaction product was stirred for about ten minutes after formaldehyde addition was completed, it was then granulated and air-dried. The vitamin A composition thus obtained assayed 242,500 units/gram.

*Example 7*

(A) A vitamin A composition assaying 242,500 units/gram was prepared following the procedure of Example 6 by employing 0.50 gram of dibutylamine in place of the cyclohexylamine of Example 6.

(B) A similar product was prepared according to the procedure with the quantities specified in Example 6 except that 0.43 gram of N-ethylpiperidine was used as the amine in place of cyclohexylamine. The yellow powder obtained assayed 237,000 units/gram.

*Example 8*

To 3.4 grams of vitamin A palmitate oil assaying $1.463 \times 10^6$ units/gram was added 0.34 gram of butylated hydroxy anisole, 0.34 gram of butylated hydroxy toluene and 0.43 gram of N-ethylpiperidine. The resulting mixture was added to 47 grams of a partial hydrolysate of casein similar to the partial hydrolysate employed in Example 5.

0.8 ml. of 37% aqueous formaldehyde was added to the above mixture at room temperature and under agitation. The resulting resinous reaction product was stirred for about ten minutes after formaldehyde addition was completed, it was then granulated and air-dried. The vitamin A composition thus obtained assayed 246,000 units/gram.

*Example 9*

In the following series of experiments the anti-oxidants were intimately admixed with the vitamin A ester and the resulting mixture uniformly dispersed in a partial hydrolysate of casein which contained about 33% solids and about 1% of α-amino nitrogen. 37% aqueous formaldehyde was added with stirring to this dispersion and the resulting semi-solid mass granulated through a screen and air-dried.

| Exp. | Vitamin A esters | Gms. | BHA, gms. | BHT, gms. | Partial casein hydrolysate (gms.) | Formaldehyde (mls.) | Potency of end product, u./gm. |
|---|---|---|---|---|---|---|---|
| (a) | Tertiary butyl acetate | 1.2 | 0.12 | 0.12 | 32 | 2.7 | 183,000 |
| (b) | Anthraquinone β-carboxylate | 1.0 | 0.1 | 0.1 | 28.6 | 2.3 | 122,000 |
| (c) | Pivalate | 0.95 | 0.1 | 0.1 | 28.0 | 2.3 | 140,000 |

Any departure from the above description which conforms to the present invention is intended to be included within the scope of the claims.

What is claimed is:

1. A composition comprising an ester of vitamin A and antioxidants therefor uniformly dispersed throughout the reaction product of one part of formaldehyde with about 10 to about 100 parts of partially hydrolyzed casein having an alpha-amino nitrogen content of 0.5 to 7%, said composition having a vitamin A activity of about 10,000 to 500,000 units per gram.

2. The composition of claim 1 wherein the ester of vitamin A is vitamin A palmitate.

3. The composition of claim 1 wherein the ester of vitamin A is vitamin A acetate.

4. A composition comprising vitamin A palmitate and antioxidants therefor uniformly dispersed throughout the reaction product of one part of formaldehyde with about 10 parts of partially hydrolyzed casein having about 1% of alpha-amino nitrogen, said composition having a vitamin A activity of about 10,000 to 500,000 units per gram.

5. A composition comprising vitamin A acetate and antioxidants therefor uniformly dispersed throughout the reaction product of one part of formaldehyde with about 10 parts of partially hydrolyzed casein having about 1% of alpha-amino nitrogen, said composition having a vitamin A activity of about 10,00 to 50,000 units per gram.

6. A composition comprising vitamin A palmitate and antioxidants therefor uniformly dispersed throughout the reaction product of one part of formaldehyde with about 10 parts of partially hydrolyzed casein having about 1% of alpha-amino nitrogen, said composition having a vitamin A activity of about 250,000 units per gram.

7. The process for preparing a stable vitamin A active composition that comprises reacting together one part of formaldehyde with about 10 to about 100 parts of partially hydrolyzed casein having an alpha-amino nitrogen content of about 0.5 to 7.0% in the presence of an ester of vitamin A and antioxidants therefor.

8. The process for preparing a stable vitamin A active composition that comprises reacting together in the presence of a vitamin A ester and antioxidants therefor one part of formaldehyde with about 10 parts of partially hydrolyzed casein having an alpha-amino nitrogen content of about 1%.

9. The process of claim 8 wherein the ester is vitamin A palmitate.

10. The process of claim 8 wherein the ester is vitamin A acetate.

11. The process for preparing a stable vitamin A active composition that comprises reacting together one part of formaldehyde with about 10 to about 100 parts of partially hydrolyzed casein having an alpha-amino nitrogen content of about 0.5 to 7.0% in the presence of an ester of vitamin A and antioxidants therefor, and granulating and drying the resultant product thereby producing a dry free-flowing vitamin A-active composition.

12. The process for preparing a stable vitamin A-active composition that comprises reacting together in the presence of a vitamin A ester and antioxidants therefor one part of formaldehyde with about 10 parts of partially hydrolyzed casein having an alpha-amino nitrogen content of about 1%, and granulating and drying the resultant product thereby producing a dry free-flowing vitamin A-active composition.

13. The process of claim 12, wherein the ester is vitamin A palmitate.

References Cited in the file of this patent

UNITED STATES PATENTS

| 2,183,053 | Taylor | Dec. 12, 1939 |
| 2,656,298 | Loewe | Oct. 20, 1953 |
| 2,693,435 | Stieg | Nov. 2, 1954 |

FOREIGN PATENTS

| 489,970 | Great Britain | Aug. 2, 1938 |

UNITED STATES PATENT OFFICE
CERTIFICATE OF CORRECTION

Patent No. 2,897,118                                            July 28, 1959

John E. Allegretti

It is hereby certified that error appears in the printed specification of the above numbered patent requiring correction and that the said Letters Patent should read as corrected below.

Column 7, line 23, for "within" read -- vitamin --; line 38, for "10,00" read -- 10,000 --; same line, for "50,000" read -- 500,000 --.

Signed and sealed this 29th day of March 1960.

(SEAL)
Attest:

KARL H. AXLINE                                          ROBERT C. WATSON
Attesting Officer                                      Commissioner of Patents